United States Patent [19]

Degnan, Jr. et al.

[11] Patent Number: 4,649,127

[45] Date of Patent: Mar. 10, 1987

[54] PROCESS FOR HYDROGENATIVE REACTIVATION OF SPENT CATALYSTS

[75] Inventors: Thomas F. Degnan, Jr., Yardley, Pa.; Nai Y. Chen, Titusville, N.J.

[73] Assignee: Mobil Oil Corporation, New York, N.Y.

[21] Appl. No.: 690,065

[22] Filed: Jan. 9, 1985

[51] Int. Cl.$^4$ .................. B01J 29/38; B01J 38/06; B01J 38/10; B01J 38/52

[52] U.S. Cl. .................. 502/33; 208/111; 502/22; 502/34; 502/53; 502/55; 502/515

[58] Field of Search .................. 502/53–55, 502/22, 32, 33, 29, 34, 515–518; 208/111

[56] References Cited

U.S. PATENT DOCUMENTS

| | | | |
|---|---|---|---|
| 3,625,865 | 12/1971 | Kittrell et al. | 502/33 |
| 3,692,692 | 9/1972 | Ward et al. | 252/412 |
| 3,699,036 | 10/1972 | Hass et al. | 208/111 |
| 3,706,658 | 12/1972 | Hass et al. | 208/111 |
| 3,849,293 | 11/1974 | Ward | 208/111 |
| 3,943,051 | 3/1976 | Ward | 208/111 |
| 4,107,031 | 8/1978 | Ward | 208/111 |
| 4,139,433 | 2/1979 | Ward | 208/111 |
| 4,190,554 | 2/1980 | Yamauchi et al. | 208/111 |
| 4,560,670 | 12/1985 | Pelring | 502/53 |

FOREIGN PATENT DOCUMENTS 52-38498  3/1977  Japan .................. 502/55

OTHER PUBLICATIONS

A. D. Reichle et al., "Hydrocracking Catalyst Rejuvenated", *The Oil and Gas* Journal, pp. 137–143, Jul. 29, 1984.

A. D. Reichle et al., "New Rejuvenation Techniques Extend Unicracking-JHC Catalyst Life", presented at the MPRA Annual Meeting in the Spring of 1974.

*Primary Examiner*—P. E. Konopka
*Attorney, Agent, or Firm*—A. J. McKillop; M. G. Gilman; M. V. Schneller

[57] ABSTRACT

A process for removing nitrogen chemically bound to a zeolite component of a catalytic composition, used in hydroprocessing feedstocks containing nitrogen precursors, including contacting the hydrogen treated used catalyst composition with polar solvents, preferably in the gaseous state, at pressures practically no greater than 100 Torr.

12 Claims, 4 Drawing Figures ly, the invention allows substantial reductions in the
PROCESS FOR HYDROGENATIVE REACTIVATION OF SPENT CATALYSTS

FIELD OF THE INVENTION

The invention is directed to improvements in hydrogen reactivation of catalysts comprising zeolites used in hydroprocessing of hydrocarbon feedstocks. Specifically, the invention allows substantial reductions in the zeolite of ammonia or ammonia precursor contaminants or poisons, which are attributable to nitrogen containing components of the feedstocks subjected to the hydroprocessing.

BACKGROUND OF THE INVENTION

Hydrogen reactivation of catalysts containing zeolites has been described. The parameters of the processes including zeolite hydrogen reactivation will often depend on the exact nature of the zeolite contaminants or poisons. The nature of those contaminants or poisons will in turn depend on the catalytic process conditions in which the catalyst was used. Various patents and printed publications describe hydrogen reactivation of catalysts containing zeolite employed in high temperature hydroprocessing conversions. For example, it appears that catalysts comprising zeolites and hydrogenation-dehydrogenation components which are employed in hydroprocessing conversions suffer redistribution, reagglomeration, of the hydrogenation-dehydrogenation component. Processes for reactivating such catalysts spent under hydroprocessing conversion conditions, including hydrogen reactivation stages, are described in U.S. Pat. Nos. 4,107,031; 4,139,433; 3,943,051; 3,849,293; 3,692,692; and A. D. Reichle et al "Hydrocracking Catalyst Rejuvenated," *The Oil and Gas Journal,* p 137–143 (July 29, 1974) and by A. D. Reichle et al "New Rejuventation Techniques Extend Unicracking—JHC Catalyst Life" presented at the NPRA Annual Meeting in the Spring 1974.

SUMMARY OF THE INVENTION

The invention is directed to rejuvenating catalysts, containing zeolites, spent in hydroprocessing conversions of hydrocarbon feedstocks, including nitrogen containing components, at temperature conditions of 900° F. or less. Nitrogen build up in the form of ammonia and ammonia precursors on zeolites during hydroconversions, and particularly during subsequent hydrogenative reactivation steps, can be significant. One aspect of the invention is to provide a hydrogen reactivation process which will remove from the zeolite physically and chemically bound nitrogen which poisons the zeolite and is not removed by one hydrogen reactivation treatment. In one embodiment, the process of the invention includes the treatment of the catalyst with a polar solvent to remove substantial amounts of nitrogen which were not removed by hydrogen reactivation. The invention also embraces the embodiment in which the spent catalyst is also treated with a polar solvent prior to such a hydrogen reactivation.

DETAILED DESCRIPTION OF THE INVENTION

Figure 1:
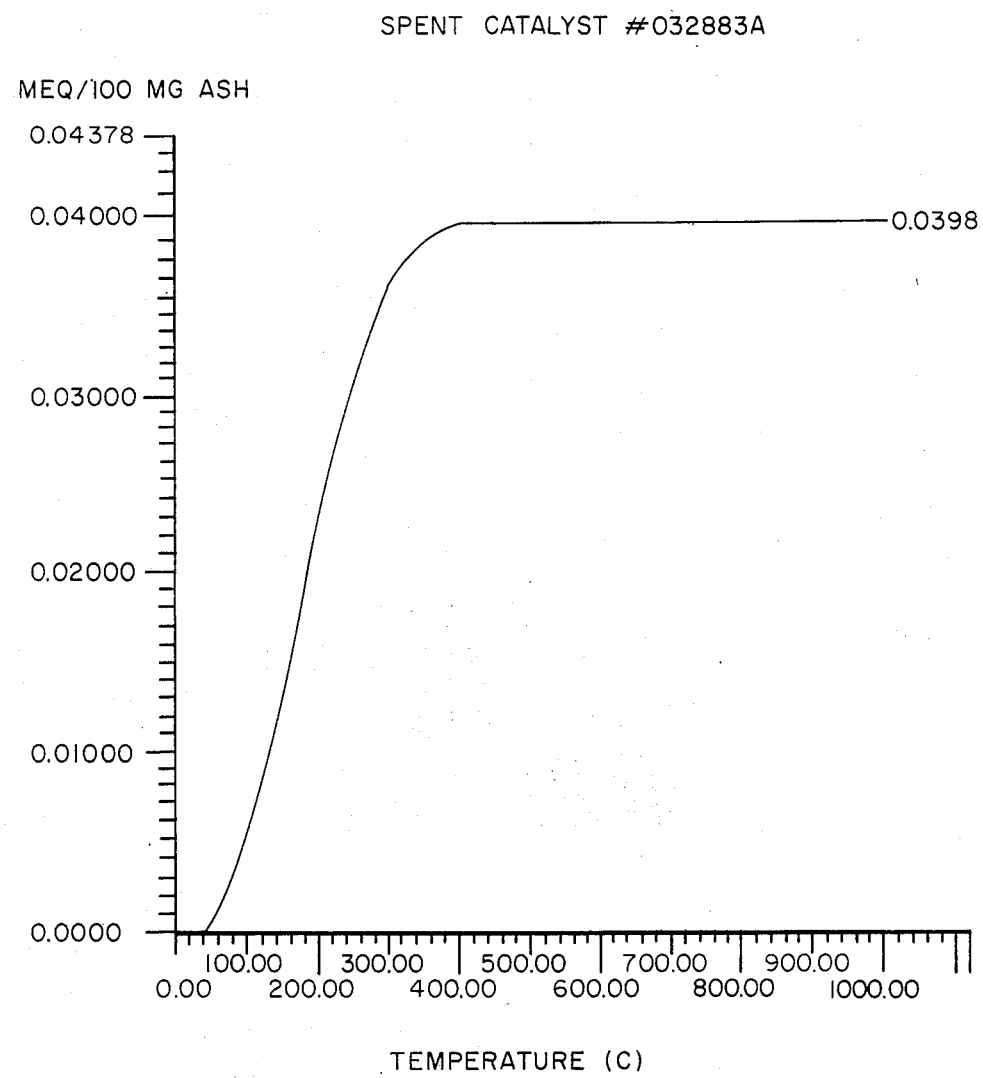
FIG. 1 shows the ammonia desorption isobar in dry helium (p=1 atmosphere) for a spent catalyst, after hydrogen treatment.

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are referred to as "molecular sieves", because, in addition to the uniform pore size, uniform channel systems in a zeolite material which can allow it to selectively absorb molecules of certain dimensions and shapes. In the context of the invention described herein, the words "contaminants" and "poisons" of the zeolites are meant to embrace those nitrogen compounds which interfere with the chemical activity of the zeolite in the catalyst composition.

The invention is directed to rejuvenating catalysts comprising zeolites used in hydrocarbon conversions resulting in nitrogen, as ammonia or ammonia precursor(s) contamination of the zeolite. Often these zeolites will be combined with at least one hydrogenation/-dehydrogenation metal because of the specific nature of the process in which the catalyst containing zeolite is used; that metal can be admixed with or deposited or exchanged on the zeolites. In many hydrocarbon conversions, the zeolite will be in the acid form; that is acid sites on the zeolite provided by, for example, aluminum will be associated with hydrogen or hydronium ion, rather than cations of alkali metal or ammonium ions.

Nitrogen contamination of the zeolitic component of a catalyst during use is, of course, predicated on the presence of nitrogen containing components in the feedstock catalytically treated. The feedstock containing those nitrogen containing components boil at temperatures greater than 550° F. Contamination at these feedstocks occurs when the conversion conditions are conducted under the following conditions:

|  | Broad | Preferred |
|---|---|---|
| Temp °F. | 450–850 | 500–750° |
| Pressure | 400–5000 | 800–2000 |
| LHSV | 0.2–10 | 0.5–5 |
| H$_2$/feedstock SCF/B | 100–10,000 | 700–2500 |

Alkylations and dewaxing processes may be conducted at temperature below 900° F. In fact, hydrodewaxing on a commercial scale may be conducted at temperatures as low as 500°–700° F.

To illustrate the extent of zeolite contamination by residue accumulation, during use, elemental analyses of the residue remaining on the 1.% Ni ZSM-5 in alumina, used in hydrodewaxing bright stock and tested and reported in the experimental section below, are set forth in Table 1:

TABLE 1

Comparison of Heptane Washed Mid- and End-of-Cycle Catalyst Residue Contents

| RESIDUE ANALYSIS* | EOC-BS** As Received | EOC-BS n-C₇ Washed |
|---|---|---|
| g/100 g of Fresh Catalyst | | |
| Carbon | 51.42 | 19.72 |
| Hydrogen | 7.09 | 2.41 |
| Nitrogen | 0.269 | 0.275 |
| Sulfur | 0.815 | 0.44 |
| Total | 59.589 | 22.845 |
| Normalized Residue Composition | | |
| Carbon, wt. % | 86.30 | 86.32 |
| Hydrogen, wt. % | 11.88 | 10.55 |
| Nitrogen, ppm | 4515 | 12038 |
| Sulfur, wt. % | 1.37 | 1.93 |
| H/C (Atomic) | 1.65 | 1.47 |

TABLE 2

Elemental Analyses of Solvent Extracted End-of-Cycle MLDW Catalysts
Soxhlet Extracted with Heptane, Toluene, Methanol and THF

| End-of-Cycle Extracted Catalyst EOC-BS | End-of-Cycle 111082-A | End-of-Cycle 111082-D | End-of-Cycle 111082-F | End-of-Cycle 111082-I | Average |
|---|---|---|---|---|---|
| Distance from Entrance of Reactor (cm) | 0–6.4 | 63–76 | 120–135 | 198–216 | |
| ANALYSIS OF EXTRACTED CATALYSTS | | | | | |
| g/100 g of Fresh Catalyst | | | | | |
| Carbon | 14.22 | 11.68 | 10.68 | 8.40 | 11.25 |
| Hydrogen | 1.78 | 1.52 | 1.02 | 1.33 | 1.41 |
| Nitrogen | 0.116 | 0.134 | 0.172 | 0.163 | 0.146 |
| Sulfur | 0.27 | 0.18 | 0.27 | 0.07 | 0.20 |
| Total: | 16.386 | 13.514 | 12.142 | 9.963 | 13.006 |
| Normalized Elemental Composition of Residue | | | | | |
| Carbon, wt. % | 86.78 | 86.43 | 87.96 | 84.31 | 86.50 |
| Hydrogen, wt. % | 10.86 | 11.25 | 8.40 | 13.35 | 10.84 |
| Nitrogen, ppm | 7080 | 9916 | 14166 | 16360 | 11226 |
| Sulfur, wt. % | 1.65 | 1.33 | 2.22 | 0.70 | 1.54 |
| H/C (Atomic) | 1.50 | 1.56 | 1.15 | 1.90 | 1.50 |

*Elemental analyses were performed by Micro-Analysis of Wilmington, Delaware.
**EOC-BS" refers to the catalyst at the end of cycle in bright stock hydrowaxing.

In accordance with the invention, it is critical to treat the hydrogen "reactivated" catalyst with a polar solvent, after that hydrogen treatment. Treatment of the spent catalyst prior to or subsequent to hydrogen reactivation with a polar solvent to remove the ammonia or ammonia precursors bound to the zeolite may involve use of various solvents: alcohols, (e.g., methanol), aldehydes, ethers, particularly cyclic ethers (THF), ketones, and water. The polar solvent will generally have a molecular weight less than about 200. The polar solvent is one which, although liquid at ambient conditions, will preferably be in the gaseous state during the catalyst treatment, subsequent to hydrogen reactivation. Polar solvent wash prior to hydrogen treatment may be with the solvent in the liquid or gaseous states.

Solvent washes prior to hydrogen reactivation and polar solvent treatment remove ammonia or ammonia precursors physically bound to the zeolite. Table 2 below illustrates the extent of removal of residue accumulated on the same catalyst (spent during hydrodewaxing) by solvent washes, including polar solvent washes prior to high temperature hydrogen reactivation. Specifically, the solvent extracted samples, analyzed in Table 2, were generated by successive Soxhlet extractions of the used catalysts in heptane, toluene, methanol, and finally tetrahydrofuran. Between extraction with each solvent, the catalysts were dried under vacuum (−28 in Hg) at 120° C. to remove solvent and then weighed to determine the amount of material extracted.

Typically, conditions used in hydrogen reactivation of catalysts spent in hydrodewaxing include temperature of 850° F. to 985° F. and pressures of 200 to 1000 psig in flowing hydrogen to remove as much of those residues as possible. To illustrate, the extent of residue removal by such a hydrogen reactivation procedure. The elemental analyses of end of cycle hydrogen reactivated 1.1% Ni—ZSM-5 in alumina catalyst are reported in Table 3. The results in Table 3 indicate that above 650° F., nitrogen is more efficiently removed than carbon, with the most efficient removal of nitrogen coming at temperatures above 800° F.

TABLE 3

Effect of Hydrogen Reactivation Temperature on MLDW Residue Content*
(14 hours reactivation in flowing hydrogen, 700 cc/min @ 400 psig)

| | End of cycle** Catalyst | 650° F. Reactivation | 800° F. Reactivation | 900° F. Reactivation | 985° F. Reactivation | 1000° F. Reactivation |
|---|---|---|---|---|---|---|
| g/100 g Fresh Catalyst | | | | | | |
| Carbon | 39.53 | 7.59 | 6.02 | 4.45 | 3.97 | 3.14 |
| Hydrogen | 6.18 | 0.96 | 0.73 | 0.48 | 0.44 | 0.43 |
| Nitrogen | 0.243 | 0.110 | 0.083 | 0.039 | 0.015 | 0.003 |
| Sulfur | 0.395 | 0.131 | 0.053 | 0.014 | — | — |
| Total Wt. Residue | 46.348 | 8.791 | 6.886 | 4.983 | 4.42 | 3.573 |
| Normalized Composition | | | | | | |
| Carbon, wt. % | 85.29 | 86.34 | 87.42 | 89.93 | 89.72 | 87.88 |
| Hydrogen, wt. % | 13.33 | 10.92 | 10.60 | 9.64 | 9.94 | 12.03 |
| Nitrogen, ppm | 5240 | 12513 | 12053 | 7827 | 3390 | 840 |

TABLE 3-continued

Effect of Hydrogen Reactivation Temperature on MLDW Residue Content*
(14 hours reactivation in flowing hydrogen, 700 cc/min @ 400 psig)

|  | End of cycle** Catalyst | 650° F. Reactivation | 800° F. Reactivation | 900° F. Reactivation | 985° F. Reactivation | 1000° F. Reactivation |
|---|---|---|---|---|---|---|
| Sulfur, wt. % | 0.85 | 1.50 | 0.77 | 0.28 | — | — |
| H/C (Atomic) | 1.88 | 1.52 | 1.45 | 1.29 | 1.33 | 1.65 |
| % Pore Volume Filled @ $\rho = 0.87$ g/cc | 72.6 | 13.8 | 10.8 | 7.8 | 6.9 | 5.6 |
| % Residue Removed | — | 81.0 | 85.1 | 89.25 | 90.5 | 92.1 |
| % Residue Remaining | 100 | 19.0 | 14.9 | 10.75 | 9.5 | 7.9 |
| meq N/meq [H+] Sites | 0.98 | 0.44 | 0.33 | 0.15 | 0.06 | 0.012 |
| Residue % N/Feed % N | 105 | 250 | 241 | 161 | 68 | 16 |

*The conditions for hydrogen deactivation reported here are recorded in Example 3.
**The history of the catalyst used in this study is set forth in Example 4.

The temperature at which polar solvent treatment is effected is sufficient to cause ammonia chemically bound to the zeolite, and unremoved or unremovable by elevated temperature hydrogen reactivation, to desorb. When water is employed as the polar solvent, the temperature ranges from greater than ambient up to about 500° C. It is noted as discussed below, that in the absence of the polar solvent treatment, desorption of ammonia chemically bound to zeolite does not occur at temperatures greater than about 350°, or even at a temperature of 800° C. However, as can be seen from the experimental work described below, desorption of chemically bound ammonia during water treatment continues to occur between about 350° C. and about 500° C.

The pressure of the polar solvent treatment is preferably at about that effective to allow the polar solvent to remain in the gaseous state. When the polar solvent is water, the upper limit of the pressure range will be less than that pressure at which steam deactivation of the zeolite will begin to occur; accordingly, an upper limit of the pressure range will be less than about 100 TORR. For practical reasons, then, the pressure of polar solvent treatment stage will range from about 20 TORR up to less than about 100 TORR.

In other studies, analyses of the same catalyst containing ZSM-5 and nickel in the catalyst and spent in processing other feedstocks, light and heavy neutrals, it was discovered that nitrogen content on that end of cycle catalyst is approximately 100 times higher than that of the feed; that nitrogen level corresponds substantially, on a milliequivalence basis, to the proton site concentration of the fresh zeolite component of the catalyst. C.f. Table 4, below:

TABLE 4

Composition Analysis of Light Neutral Feed and of Spent Catalyst After Extraction and 650° F. Reactivation*

|  | Paulsboro 318 Light Neutral | End-of-Cycle Catalyst | THF** Extracted Catalyst | THF* Extract | 650° F. Reactivated Catalyst | 650° F.*** Desorbate |
|---|---|---|---|---|---|---|
| (g/100 g Fresh Catalyst) |  |  |  |  |  |  |
| Carbon | — | 39.53 | 11.61 | 27.92 | 7.59 | 31.94 |
| Hydrogen | — | 6.19 | 1.88 | 4.31 | 0.96 | 5.23 |
| Nitrogen | — | 0.243 | 0.198 | 0.045 | 0.110 | 0.133 |
| Sulfur | — | 0.40 | 0.17 | 0.23 | 0.13 | 0.27 |
| Total g/100 g Fresh Catalyst: | — | 46.363 | 13.858 | 32.505 | 8.79 | 37.573 |
| Carbon, wt. % | 85.32 | 83.78 | 85.89 | 86.38 | 85.01 |  |
| Hydrogen, wt. % | 13.85 | 13.33 | 13.57 | 13.26 | 10.89 | 13.92 |
| Nitrogen, ppm | 46 | 5240 | 14290 | 1385 | 12500 | 3540 |
| Sulfur, wt. % | 0.83 | 0.85 | 1.23 | 0.71 | 1.48 | 0.72 |
| H/C Atomic | 1.95 | 1.88 | 1.94 | 1.85 | 1.51 | 1.96 |
| API Gravity, 25° C. | 30.9 |  |  |  |  |  |
| Specific Gravity, 25° C. | 0.8713 |  |  |  |  |  |

*Catalyst History and Properties are reported in Example 4.
**On a THF-free basis.
***Calculated by difference.

EXPERIMENTAL

The history of the spent catalyst subjected to reactivation in accordance with the invention follows. The catalyst is 1.1% Nickel on ZSM-5 on alumina 1/16" extrudate, presteamed and used in dewaxing Paulsboro bright stock. The catalyst was removed from the reactor after a total of 104 DOS and three cycles. The conditions of the three cycles, as well activations subsequent to the first two cycles, are tabulated below:

| Catalyst | 1.1% Ni on ZSM-5/Al₂O₃ (65:35), 1/16" Extrudate, Presteamed |
|---|---|
| Unit Used for this Study | 1.27 cm OD Reactor, 214 cm long containing 83 g of catalyst and 83 g of 60–80 mesh Vycor |
| First Cycle | Paulsboro 345 Bright Stock Raffinate, 81D-590, LHSV = 1.0, 400 psig, SOC = 560° F., EOC = 675° F., Total DOS = 41, Aging rate = 3.3° F./day |
| Reactivation | 900° F. in 1000 cc/min H₂ at 400 psi for 24 hours |
| Second Cycle | Paulsboro 345 Bright Stock Raffinate, 81D-590, LHSV = 1.0, 400 psig, SOC = 560° F., EOC = 642° F., Total DOS = 14, Aging Rate = 5.9° F./day |
| Reactivation | 1000° F. in 1000 cm/min H₂ at 400 psig for 24 hours |
| Third Cycle | Paulsboro 345 Bright Stock Raffinate 81D-590, 400 psig<br>Days 0–10; LHSV = 1.0, $T_i$ = 555°, $T_f$ = 604°<br>Days 10–20; LHSV = 0.5, $T_i$ = 577°, $T_f$ = 591°<br>Days 20–50; LHSV = 0.75, $T_i$ = 598°, $T_f$ = 675° |

After removal from the reactor following the third cycle, the catalyst was towel dried and then dried in a vacuum oven (−29 in. Hg at 120° C.).

Figure 2:
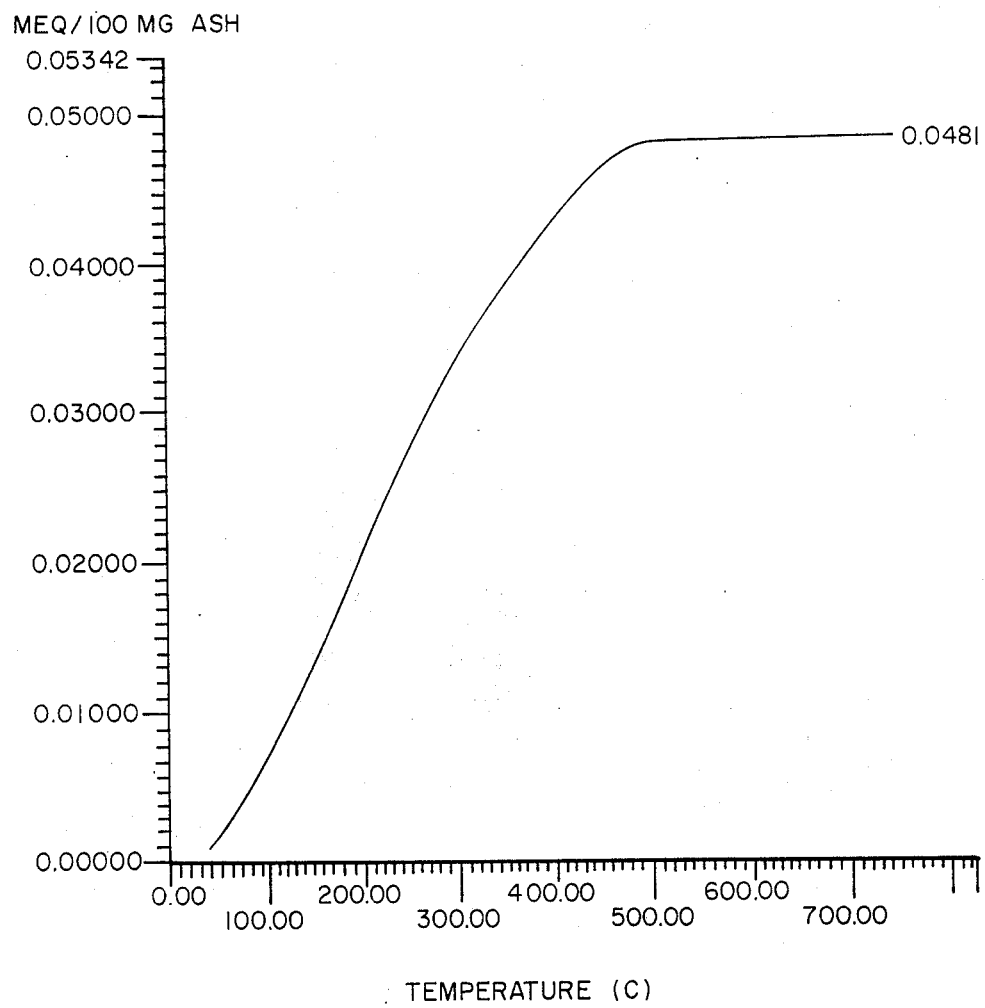
FIG. 2 shows the effect of heating another sample of the same spent hydrogen treated catalyst in the presence of a dry helium stream which has been bubbled through a polar solvent, after hydrogen treatment.
Figure 3:
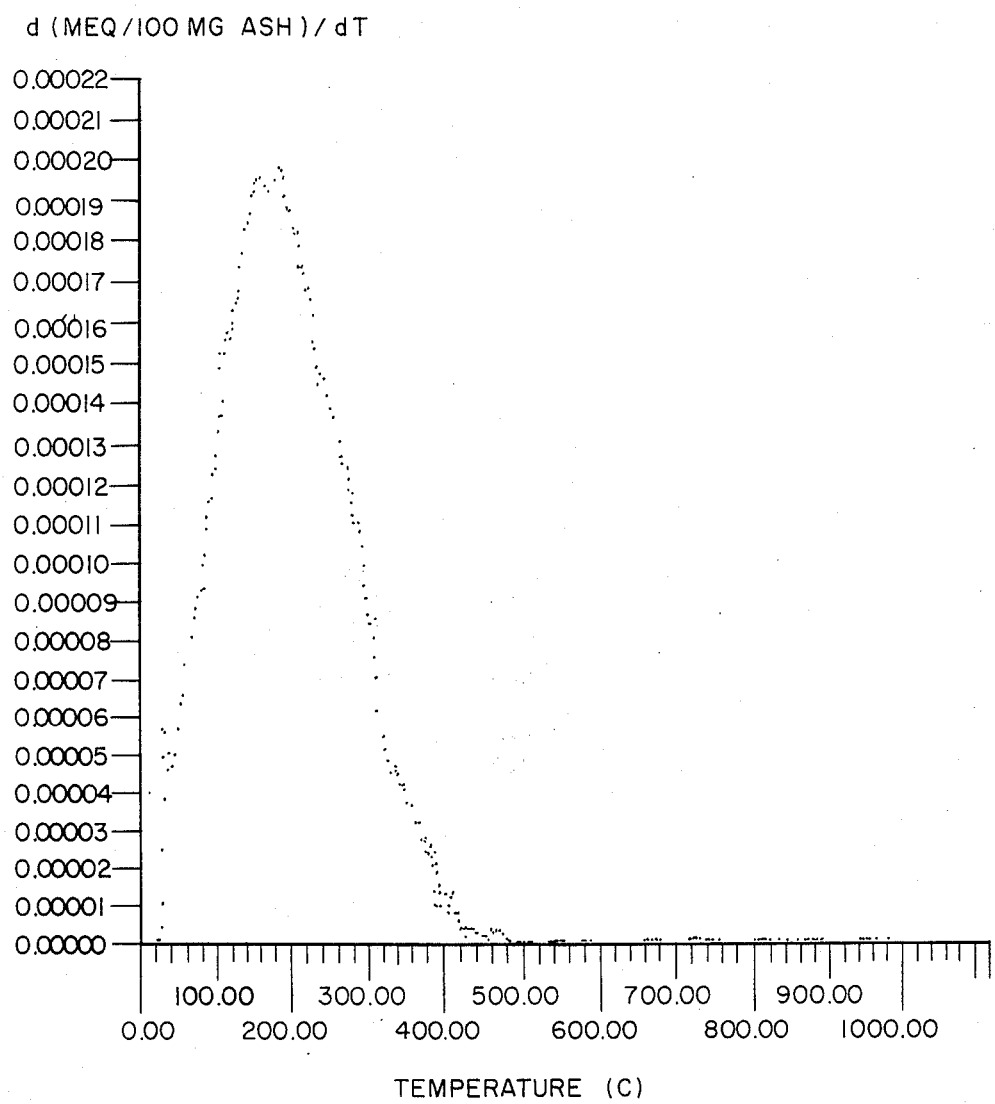
FIG. 3 shows the derivative curve for the desorption of ammonia v. temperature for the spent catalyst treated in a stream of dry helium. This figure plots the change in ammonia desorbed with change in temperature v. temperature.
Figure 4:
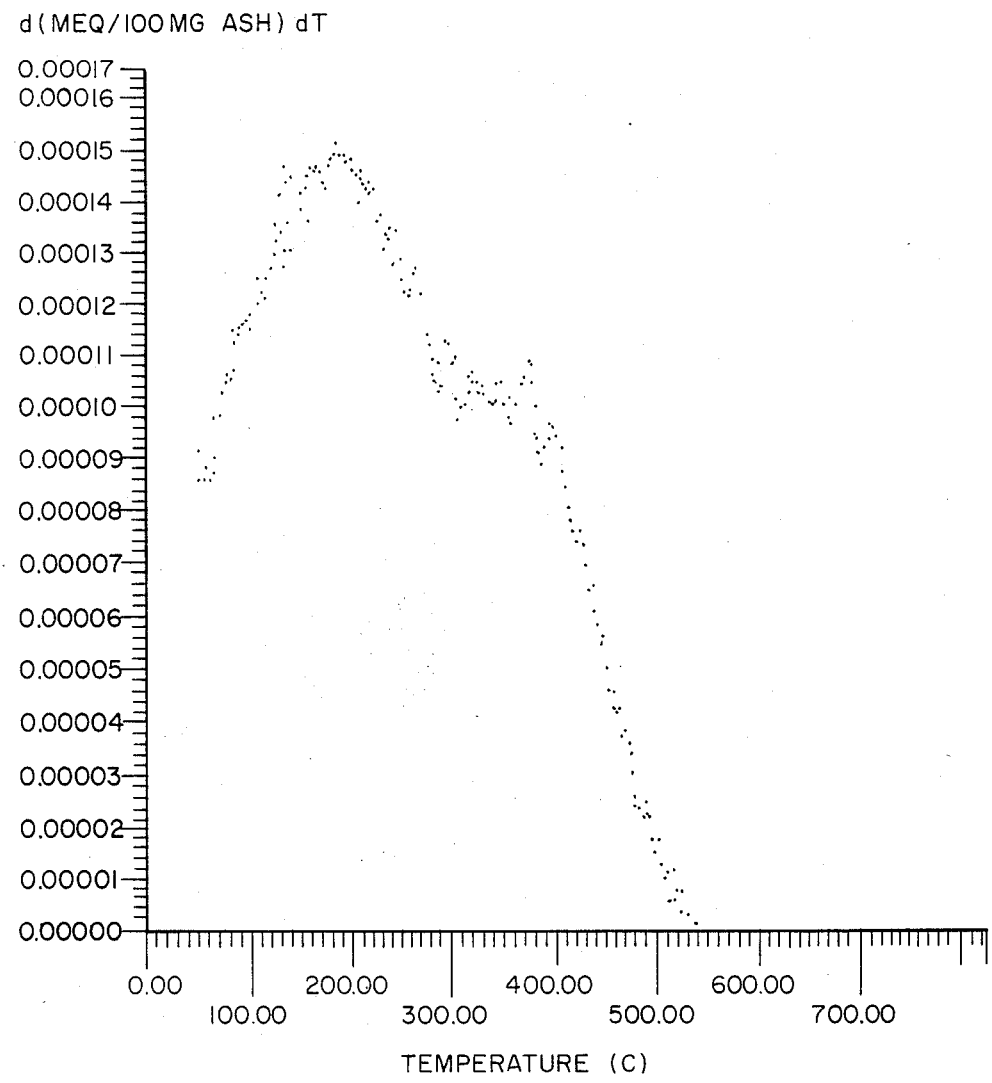
FIG. 4 shows the derivative curve for the desorption of ammonia v. temperature for the spent catalyst treated in a stream of helium which has been bubbled through a polar solvent. This figure plots the change in ammonia desorbed with change in temperature v. temperature.

Hydrogen reactivation of the catalysts used in the studies to generate the results depicted in FIGS. 1 and 2 was conducted using hydrogen containing 800 ppm $NH_3$ at 400 psig, 900° F. at an STP linear gas velocity of 354 cm/min for about 24 hours; ammonia addition was to simulate the typical level of $NH_3$ in a hydrogen reactivation recycle stream.

The effect of polar solvent treatment of the catalyst, following hydrogen reactivation, to remove chemically bound ammonia remaining after hydrogen treatment, and its potential for restoring additional acid sites were revealed by two simple experiments.

EXAMPLE 1

The effect of using a polar solvent is shown in the attached figures. FIG. 1 shows the ammonia desorption isobar in dry helium (p=1 atm) for a spent catalyst used in the dewaxing of a lube stock and subsequently treated in hydrogen and 800 ppm of $NH_3$ at 400 psig, 900° F., at an STP linear gas velocity of 354 cm/min. (As indicated above the ammonia was added to simulate the typical level of $NH_3$ present in the recycle stream. Approximately, 0.04 meq $NH_3$/100 mg of catalyst ash are removed by this treatment. Note that all the $NH_3$ is removed at temperatures below 300° C. corresponding primarily to physically adsorbed $NH_3$. No $NH_3$ is removed above 350° C. even at temperatures greater than 800° C.

Dupont 921 thermogravimetric analyzer (TGA) coupled to an automatic ammonia titrater Brinckmann Automatic Ammonia Titrater was used on the experiments.

EXAMPLE 2

The effect of adding water as a polar solvent to desorb chemically bound $NH_3$ is shown in FIG. 2, where another sample of the same catalyst is exposed to 20 TORR of $H_2O$ as it is heated at 20° C./min. The water-saturated gas removes 0.05 meq $NH_3$/100 mg ash, i.e., approximately 25% more $NH_3$ than the stream without $H_2O$. This additional $NH_3$ was chemically bound to the catalyst as denoted by the fact that it all desorbed in the 350° C. to 500° C. which is characteristic of the temperatures required to desorb chemically bound $NH_3$ from zeolites. Chemically bound $NH_3$ is situated near acidic sites and is known to interfere with catalytic cracking of hydrocarbons.

The results of these experiments indicate that the polar solvent wash of the catalyst comprising the zeolite, in accordance with the invention, removes more ammonia from the catalyst, probably ammonia chemically bound thereto, than is removed by a high temperature hydrogen treatment.

EXAMPLE 3

Hydrogen reactivations recorded in Table 3, were carried out at 400 psig in flowing hydrogen (700 cc/min STP) in a 1.59 cm dia. isothermal microreactor using a procedure described below.

Hydrogen reactivation comprised loading 4 grams of the spent catalyst into a 1.59 cm ID stainless steel microreactor and heating the catalyst in flowing hydrogen to the desired reactivation temperature. The following program was used for all reactivations:

| 25° C.–150° C. | 60 min. |
| 150° C.–250° C. | 60 min. |
| 250° C.–Reactivation Temp. | @ 50° C./hr. |

Pressure was maintained at 400 psig by means of a Grove loader. Dry hydrogen flow rate was 700 cc/min (STP).

The duration of the reactivation was timed from the point that the catalyst temperature, as measured by a thermocouple placed in the center of the bed, reached the reactivation temperature until cool down began. The catalyst was cooled to room temperature under pressure, in flowing hydrogen over a two hour period.

EXAMPLE 4

The History of Spent Catalyst Used in the Study reported in Table 4 follows:

| Parent: | 1.1% Nickel on ZSM-5/$Al_2O_3$ (65:35); 1/16" Extrudate, Presteamed |
| --- | --- |
| First Cycle: | Combination of Heavy Neutral Stocks; 650° F. EOC; LHSV = 1, Totasl DOS = 17, SOC = 570° F. |
| Reactivation: | 900° F. maximum reactivation temperature for 24 hours in flowing hydrogen |
| Second Cycle: | Series of Light Neutral Stocks; LHSV = 1.0; Total DOS = 36; EOC = 657° F. |

Catalyst was removed from the reactor immediately upon reaching end-of-cycle temperature; no solvent wash or hydrogen flush was applied.

The hydrogen reactivation process of the invention will result in more complete restoration of catalytic cracking activity and thus longer operating cycles, with less down time for reactivation. Less down time will translate into higher throughput rates.

What is claimed is:

1. A process for reactivating a catalyst composition, comprising a zeolite and a binder material, and for removing ammonia and ammonia precursors from said zeolite, wherein said reactivating is subsequent to use of said catalyst composition in hydroprocessing a hydrocarbon feedstock including nitrogen containing components under hydroprocessing conditions including a temperature ranging from about 450° to about 850° F., a pressure ranging from about 400 to 5000 psig, an LHSV of 0.2 to 10 and $H_2$/feedstock of 100 to 10000 SCF/B, wherein said process for reactivating comprises passing hydrogen over the catalyst composition at temperatures ranging from about 850° F. to about 950° F. and pressures ranging from about 200 to about 1000 psig, and then contacting the hydrogen contacted catalyst composition with a polar solvent wherein said polar solvent has a molecular weight of less than about 200 and is a liquid at ambient conditions and is at least one compound selected from the group consisting of alcohols, aldehydes, ethers, and ketones at temperatures ranging from above ambient and up to about 500° C., at pressures ranging from about atmospheric up to about 1000 psig for a time sufficient to at least begin desorption of nitrogen, remaining after said hydrogen contact.

2. The process of claim 1 wherein the catalyst used in the hydroprocessing conversion is ZSM-5.

3. The process of claim 1, wherein the catalyst composition further includes at least one metal selected from Group II or Group VIII of the Periodic Table.

4. The process of claim 1, wherein the polar solvent is in the gaseous state.

5. The process of claim 1, wherein the severity of the conditions of hydrogen contact does not exceed those equivalent to a temperature of about 900° F. at 400 psig.

6. The process of claim 2, wherein the ZSM-5 is in the acid form.

7. A process for reactivating a catalyst composition, comprising a zeolite and a binder material, and for removing ammonia and ammonia precursors from said zeolite, wherein said reactivating is subsequent to use of said catalyst composition in hydroprocessing a hydrocarbon feedstock including nitrogen containing components under hydroprocessing conditions including a temperature ranging from about 450° to about 850° F., a pressure ranging from about 400 to 5000 psig, an LHSV of 0.2 to 10 and H$_2$/feedstock of 100 to 10000 SCF/B, wherein said process for reactivating comprises passing hydrogen over the catalyst composition at temperatures ranging from about 850° F. to about 950° F. and pressures ranging from about 200 to about 1000 psig, and then contacting the hydrogen contacted catalyst composition with a polar solvent for a time sufficient to at least begin desorption of nitrogen, remaining after said hydrogen contact, under conditions of temperature and pressure, under which conditions ammonia and ammonia precursors chemically bound to said zeolite desorb from said zeolite, wherein said polar solvent has a molecular weight of less than about 200 and is a liquid at ambient conditions and is at least one compound selected from the group consisting of alcohols, aldehydes, ethers, and ketones, wherein the temperatures of said polar solvent contacting range from above ambient and up to about 500° C., wherein pressures of said polar solvent contacting range from about atmospheric up to about 1000 psig.

8. The process of claim 7, wherein said temperature during polar solvent contacting is at least about 350° C.

9. The process of claim 7, wherein the catalyst used in the hydroprocessing conversion is ZSM-5.

10. The process of claim 7, wherein the catalyst composition further includes at least one metal selected from Group II or Group VIII of the Periodic Table.

11. The process of claim 7, wherein the severity of the conditions of hydrogen contact does not exceed those equivalent to a temperature of about 900° F. at 400 psig.

12. The process of claim 9, wherein the ZSM-5 is in the acid form.

* * * * *